FIP8102 XR 3,151,295 CROSS REFERENCE SEARCH ROOM

INVENTOR.
ROBERT PAUL HAVILAND
BY
Henry W. Kaufmann
AGENT

Sept. 29, 1964 R. P. HAVILAND 3,151,295
COMMUNICATION SYSTEM EMPLOYING MEANS FOR ADJUSTING THE POWER BETWEEN CONTROL AND RELAY STATIONS
Filed Dec. 8, 1960 4 Sheets-Sheet 2

INVENTOR.
ROBERT PAUL HAVILAND
BY
Henry W. Kaufmann
AGENT

INVENTOR.
ROBERT PAUL HAVILAND
BY
Henry W. Kaufmann
AGENT

INVENTOR.
ROBERT PAUL HAVILAND
BY
Henry W. Kaufmann
AGENT 3,151,295

COMMUNICATION SYSTEM EMPLOYING MEANS FOR ADJUSTING THE POWER BETWEEN CONTROL AND RELAY STATIONS

Robert P. Haviland, Radnor, Pa., assignor to General Electric Company, a corporation of New York Filed Dec. 8, 1960, Ser. No. 74,649
6 Claims. (Cl. 325—3)

This invention relates to communication by waves in space, and particularly to method and apparatus for radio communication.

There is known the practice of relaying radio communications by receiving, by a relay receiver, a signal to be relayed, and applying the signal or information content of the received signal to a relay transmitter and retransmitting the signal or information content thereof by the relay transmitter. In various embodiments such a device may be known as a transponder, or an automatic relay station, or simply as a booster or a repeater. Such devices are particularly useful at so-called quasioptical frequencies which undergo substantialy line-of-sight propagation; intermittently serviced highly reliable repeaters located high upon the hilltops may, for example, replace telephone lines across rocky mountains, with a considerable increase in reliability under severe weather conditions such as sleet. Because the modern telephone art employs carrier communication with great freedom, these repeater facilities are in practice usually broad-banded multiple-channel devices. As replacements of fixed line facilities, they have, not unnaturally, been designed and installed to receive signals from a transmitter located in a first particular direction and to restransmit them in a second particular direction.

A different kind of receiver-transmitter is the radar beacon (or the identification transponder) which is intended to respond to signals from a wide variety of differently oriented transmitters at different ranges; but, unlike the telephone system repeater, it is not expected to furnish more than one effective channel at a time. That is, if two different radar sets endeavor to trigger a radar beacon simultaneously, and the signal from one is so strong that it reduces the beacon receiver sensitivity so much that the weaker second signal cannot trigger the beacon, the recognized remedy for the operator of the second radar set is: to wait for the first set to stop interrogating the beacon.

In the telephone relay and in the radar beacon there is considerable permissible variation in received or interrogating signal strength because automatic gain control applied to the receiver can accommodate such variation in a single incoming signal. It should be noted that the input signal to the telephone repeater, although it may carry separate and distinct information from numerous communication channels, is still a signal from a single transmitter, and the system is predicated upon the assumption that there will be no selective fading so severe that different spectral portions of the signal will shift level significantly with respect to each other.

There are some uses for a repeater which would not be confined to operation between only two particular stations. Purely as an example of the kind of situation which could utilize such a repeater, one may conider a central relay station provided to facilitate communication between radio-equiped automobiles operating in the quasi-optical region; an elevated repeater station would be very useful for such purpose. Assuming that a number of carrier channels are in use, it is obviously possible but expensive to provide a separate receiver and transmitter for each channel it is desired to relay. It might appear a possible alternative to employ one broad-band relay receiver tide, by suitable demodulation and modulation or other conversion equipment, to a broad-band relay (or repeater) transmitter. However, variations in the ranges from the transmitting car to the repeater, and variations in the propagation loss between the transmitting car and the repeater, would cause a greater difference in level of signals received simultaneously at the repeater than any economically feasible relay receiver could tolerate. If the relay receiver gain control were adequate to prevent blocking by very strong nearby signals, weak signals from distant primary transmitters would be lost; if very strong primary transmitter signals were permitted to block the relay receiver, no signals would be relayed.

It has occurred to me that this problem could be avoided if the power of the primary transmitter in each automobile were automatically adjusted to produce at the broad-band receiver of the repeater a specified level, which would be the same for all channels, and would be maintained the same so that the relay receiver might have a relatively small dynamic range and yet receive signals adequately on all channels. Alternatively, if the various transmitter produced radiation of different bandwidths, it might be desired to produce at the delay receiver signals which had equal signal strengths per kilocycle of bandwidth, and therefore were different in total effective voltage if they differed in bandwidth. Similarly, it is conceivable that circumstances might exist which would render it desirable that one signal be given preference over another by being permitted to have a higher effective voltage for some reason other than bandwidth. It thus appears that what is desirable is not necessarily the control of transmitter power to achieve equal signal strengths at the relay receiver input, but more generally the control of the power of each primary transmitter to produce a predetermined signal strength at such input, due consideration being given to whether a complete amplitude or frequency modulated carrier with all sidebands, or one sideband alone, or one plus a vestigal second sideband, or any of the well-known possible transmitting techniques were being used.

I have invented a manner of effecting this desirable result. As part of my invention I teach two basic methods of and apparatus for doing so; and how the two may be combined to produce a further improved third embodiment. Since the range between the radiative primary transmitter and the repeater receive is in large measure the controlling factor in determining received signal strength, the primary transmitter power may be varied by a factor proportional to signal path loss calculated from known range. This calculation may be accomplished in a variety of ways, ranging from completely manual to fully automatic. However, propagation conditions may cause considerable variation at various times in losses even over the same path. I therefore also teach the measurement of path loss by the transmission of a standard or reference level signal from the repeater transmitter. According to this teaching, the power of the primary transmitter is made inversely proportional to the locally received level of the standard or reference signal from the repeater. Thus the higher the path loss, the higher the primary transmitter power used. Another teaching is to combine the alteration of primary transmitter power in accordance with path length and the alteration in accordance with the locally received level of the standard signal. It may appear that the last teaching is unnecessary, since it would seem that the use of the standard level signal would produce practically perfect compensation. If however, it be considered that a ten to one variation in range may require a hundred to one variation in primary transmitter power, it appears that actual switching of final primary transmitter stages in and out may be required for gross changes which may conveniently be made on a basis of range, while the standard level signal will be used for smaller changes.

It is, of course, clear that the mundane example of a fleet of automobiles may equally well be an intercommunicating fleet of helicopters exploring foothills around a central peak surmounted by a repeater, or ground-based primary stations utilizing a repeater carried by an aeroplane or a balloon, or even an extraterrestrial satellite. For these latter instances, range data may be obtained by some automatic distance-measuring equipment and furnished automatically by such equipment to operate an automatic system of some kind to make adjustment of the power output of the primary transmitter.

Thus a general object of my invention is to reduce the cost, weight, complexity, and number of units in equipment for relaying signals from a number of different transmitters having various transmission path losses to the repeater.

Another object accomplished by my invention is to permit the improved use of a single broad-band repeater for relaying messages from sources having different and time-varying transmission losses to the repeater.

Other objects of my invention will appear in the following specification and description of my invention.

For better understanding of my invention I have provided figures of drawings as follows.

Figure 1:
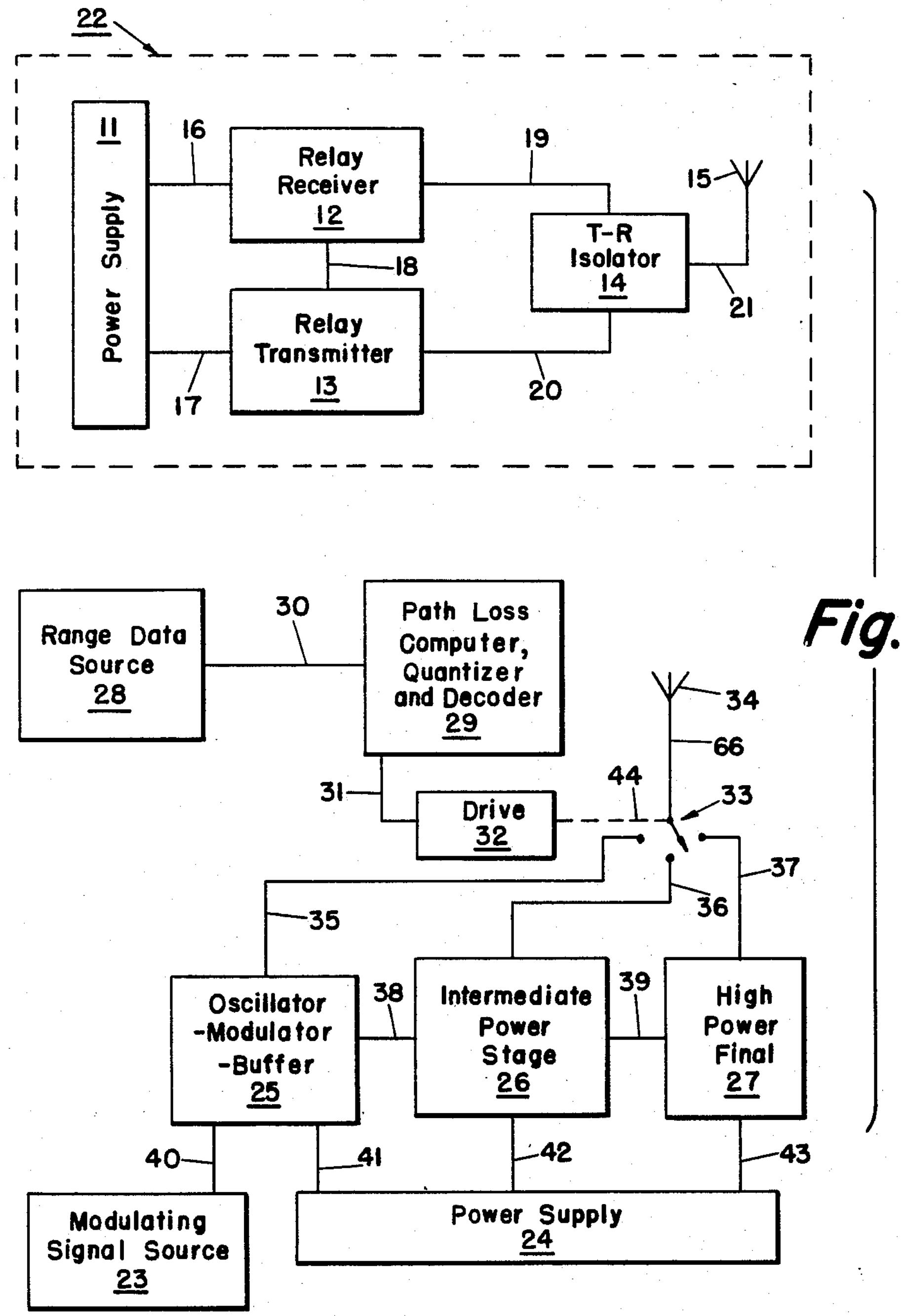
FIG. 1 represents in block form an embodiment of my invention in which the power of the primary transmitter is adjusted by steps in accordance with the path loss to the relay or repeater, calculated from range data.
Figure 3:
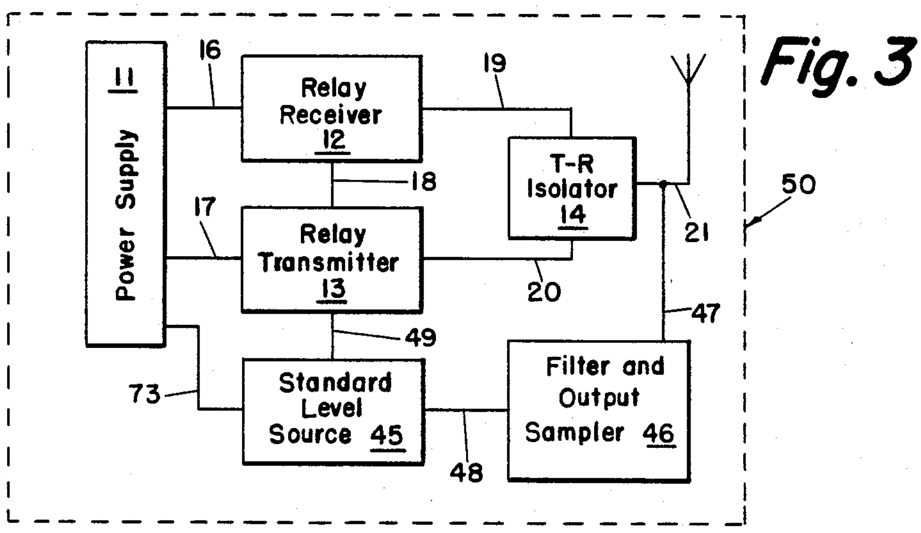
Figure 4:
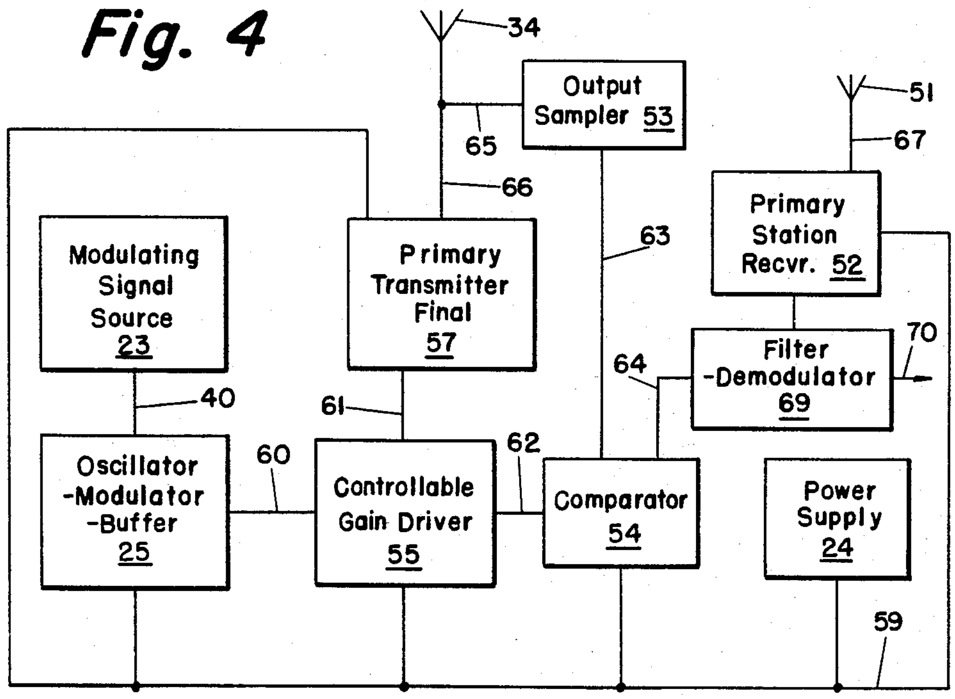
Figure 5:
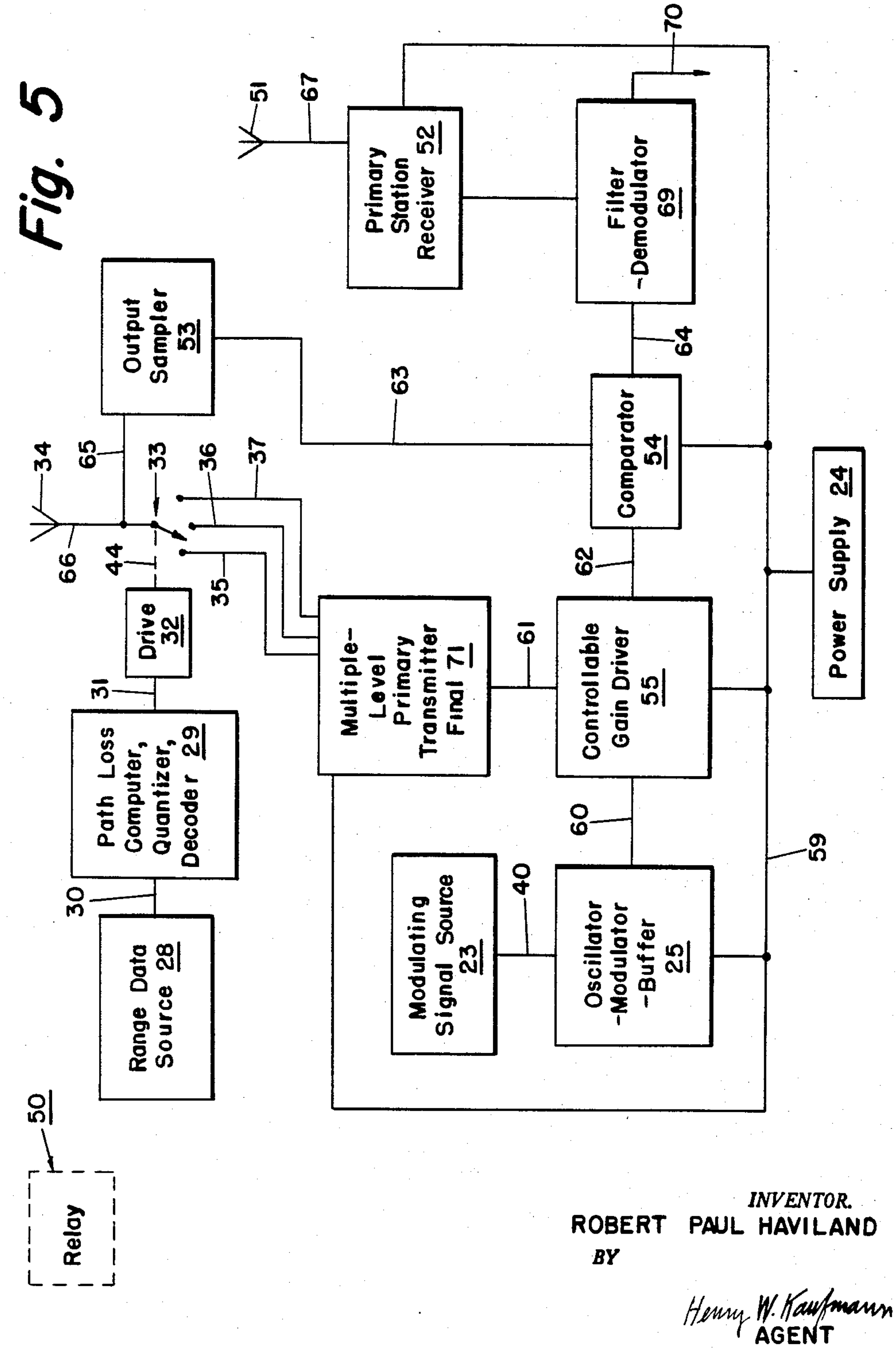

FIG. 3 represents in block form an embodiment of my invention in which a signal of a standard level is transmitted by the relay transmitter, and FIG. 4 represents in block form an embodiment of my invention in which the power output of the primary transmitter is adjusted in accordance with the locally received level of the standard level signal transmitted by a relay transmitter in accordance with FIG. 3; and FIG. 5 represents in block form an embodiment of my invention in which the power output of a primary transmitter is adjusted by steps in accordance with the path loss to a relay as calculated from range data in accordance with FIG. 1, and the power output of the same primary transmitter is continuously adjusted in accordance with FIG. 4 with the locally received intensity of the signal of standard level transmitted by a relay transmitter in accordance with FIG. 3.

Referring to FIG. 1, within the dashed rectangle 22 there are represented in block diagram form the essential elements of a relay suitable for unattended operation, and capable of being embodied in a light compact structure, such as would be desirable in a relay or repeater intended to be dropped from a helicopter to a mountain top, or to be carried in space as a satellite of a focal body. Power supply 11 is represented as furnishing energy by line 16 to relay receiver 12, and by line 17 to relay transmitter 13. The output of relay receiver 12 is conveyed by line or channel 18 to the signal input of relay transmitter 13. An antenna 15 is represented as connected by channel 21 to a transmit-receive isolator 14, which by channels 19 and 20 completes the connection of antenna 15 to relay receiver 12 and relay transmitter 13, respectively.

In all cases, block representation has been employed to show the relations, according to my invention, of elements which may be physically embodied, in accordance with well known teachings of the art, in almost innumerable different designs. The art of radio communications is over 60 years old; the Proceedings of the Institute of Radio Engineers are in their 48th volume of publication; the art is far too prolific to make it feasible or profitable to show detailed circuitry. In accordance with this mode of presentation, single lines represent in the figures channels or circuits which ordinarily require at least two separated conductors although certain lines or channels, such as 19, 20, and 21 in FIG. 1 may quite as readily be waveguides. Similarly, separate power supplies have been represented as connected to certain devices (such as transmitters and receivers) which definitely require external electrical power for their operation, and in which convention is consistent with the use of a separate power supply. Certain other elements, which may be electrically powered, but concerning which the convention of separate power supplies is less common (such as computing devices, which often have their power supplies integral with the computer) have been represented without connection to the separate power supply, since very ordinary skill in the art will suffice for determination of the power supply requirements of the various embodiments represented by blocks. For general reference upon radio communication, attention is invited to the publications of the Institute of Radio Engineers, New York city, New York, which is themselves and by the references they contain cover the whole of a fast-growing and extremely voluminous field.

The relay receiver 12 is assumed to be adapted to receive separately signals arriving on the various channels utilized by the various primary transmitters whose signals are to be relayed. Its output is fed to relay transmitter 13, which is adapted to transmit on a different channel signals received from each different primary transmitter. A simple specific embodiment of relay 22 may have relay receiver 12 adapted to receive amplitude- or frequency-modulated signals by beating them to a convenient intermediate frequency which preserves the various received signals distinct in different portions of the intermediate-frequency passband of the receiver. This entire intermediate-frequency received signal, suitably amplified, may then be applied to modulate relay transmitter 13 which transmits the entire spectrum of received signals, grouped around the carrier frequency of transmitter 13. This particular embodiment has been described as one which would be desirable for use in a relay where weight and equipment complexity must be minimized, as, for example, in a satellite-borne repeater. For the same reason, the use of a single antenna 15 has been represented, with the transmitter and receiver both connected to it in non-interfering fashion by the use of transmit-receive isolator 14, which may be a balanced decoupler (for example, of the ring type) or may, if the receiver and transmitter operate over different frequency bands, be a frequency-selective filter system. Alternatively, separate antennas may be used provided that the coupling between them is insufficient to produce instability of the repeater system.

Passing on to the primary transmitter, in FIG. 1 the primary transmitter is represented as comprising oscillator-modulator-buffer 25, which by channel 38 drives intermediate power stage 26, which in turn by channel 39 drives high power final stage 27. Power is furnished from power supply 24 to these transmitter units by channels 41, 42, 43, respectively. Modulating signal source 23 is represented as connected by channel 40 to the oscillator-modulator-buffer 25. A three-position switch 33 is represented as connected by conductors 35, 36, and 37, respectively, to the various stages of the transmitter. In the same figure, range data source 28 is represented coupled by channel 30 to path-loss computer, quantizer, and decoder 29, whose output is transmitted by channel 31 to drive unit 32, which is coupled mechanically by connection 44 to the movable portion of switch 33. The movable part of switch 33 is connected by channel 66 to antenna 34. In operation, range data source 28 transmits instrumental information concerning the range between the primary transmitter and the relay. This may be originated in a wide variety of forms, varying with requirements, from switches or levers set in accordance with range obtained by human calculations to analogue or digital electrical signals obtained from electronic distance-measuring devices. Range data source 28 transmits a quantity representative of the range information to path-loss computer, quantizer, and decoder 29. This device, in its simplest form, may be mechanical, employing cams to compute a factor associated with the path loss and other cams to decode this loss into a signal indicative of the corresponding proper setting of switch 33 to select the transmitter output power level best adapted to produce a proper signal level at receiver 22. In a more sophisticated form, it can be an electrical computer and servo system. The decoded impulse is then transmitted to drive 32 by channel 31; and drive 32 (which, in an all-electrical computing, quantizing, and decoding system may be a synchro) rotates the moving part of switch 33 by mechanical connection 44. The term "quantizer" is included in the title of symbolic rectangle 29 because it is necessary that the system be so designed that switching of the antenna 34 from one primary transmitter stage to another will occur only when the range has so altered that the change is calculated to produce a closer approach to the desired level of signal at repeater 22, and will occur as a discrete step from one position of the switch to the next.

The operation of a system as represented by FIG. 1 is a step-wise switching of the antenna 34 of the primary station from one stage of the transmitter to the next in accordance with changes in the range from the primary transmitter to repeater 22. The accuracy of the system depends on large part upon the accuracy of the range data which enter the system from range data source 28, upon the accuracy with which the actual path loss duplicates that calculated from the range data, and upon the sufficiency of the number of steps of output power which are available for selection to compensate for changes in the path loss.

Figure 2:
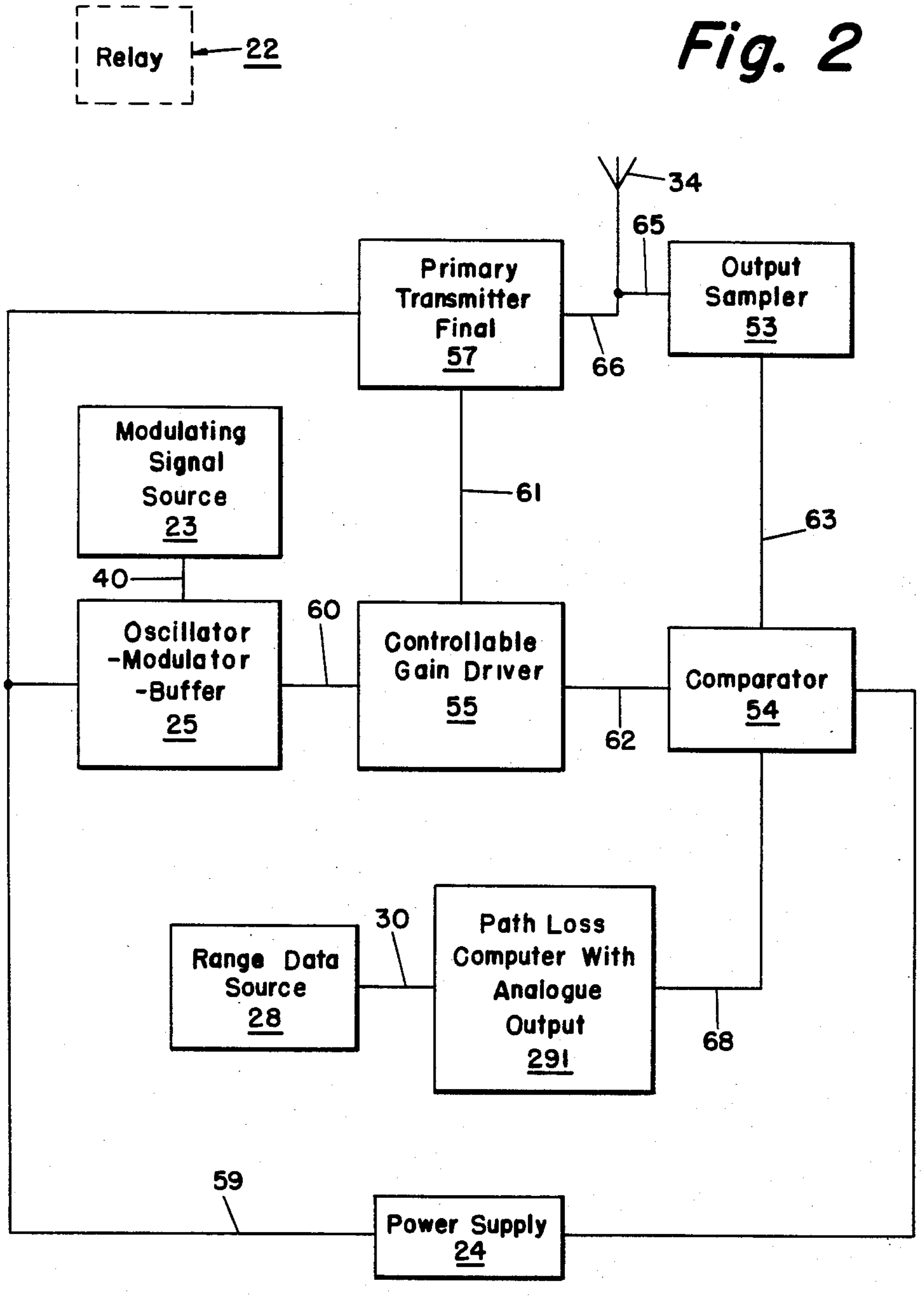
FIG. 2 represents in block form an embodiment of my invention in which the power output of the primary transmitter is continuously adjusted in accordance with the path loss to the repeater, calculated from range data.

To provide a continuous adjustment in transmitter power instead of the stepwise (or quantized) adjustment provided by the particular disclosure of FIG. 1, an embodiment in accordance with FIG. 2 may be employed. Here modulating signal source 23 is represented connected to oscillator-modulator-buffer 25 by channel 40 in the same fashion as represented in FIG. 1. The output of the buffer 25 is, however, communicated by channel 60 to controllable-gain driver 55, which is simply an amplifier whose gain can be readily controlled by an electrical signal, such as a grid-biasing potential, which is applied via channel 62. The amplified output, of amplitude determined by the control signal applied through channel 62, is then fed via channel 61 to primary transmitter final stage 57, whose output is fed through channel 66 to antenna 34. Range data source 28 furnishes an output signal via channel 30, representative of the range from the primary station to the repeater 22. This output is, however, transmitted to path loss computer with analogue output 291, whose purpose is analagous to that of path loss computer, quantizer, and decoder 29, but which does not quantize, and which produces an analogue output which is passed through channel 68 to comparator 54. Comparator 54 may be a differential amplifier, designed along the principles enunciated in "Vacuum Tube Amplifiers," by Valley and Wallman, volume 18 of the Radiation Laboratory Series, McGraw-Hill Book Company, New York city, New York (1948), pp. 441–451. The second input to comparator 54 arrives via channel 63 from output sampler 53, which is represented as coupled via channel 65 to antenna channel 66. Output sampler 53 is a device for producing a voltage output whose magnitude is a measure of the amplitude of the radiated energy provided by the primary transmitter. It may consist of a probe or small dipole suitably connected to a diode rectifier and to a small filter to remove the radiated-frequency components, and, probably desirably, the modulation components as well, since what is desired from sampler 53 is an output whose variations are fast enough to take account of changes in the average power radiated from the antenna 34, but not the high-speed variations which are the result of modulation. The sampler 53 may alternatively be connected by a metallic conductor to the channel 66 which connects primary transmitter final 57 to antenna 34; in such case channel 65 would be an actual metallic conductor. Alternatively it may be connected to channel 61, in which case the system is operated upon the assumption that gain through primary transmitter final stage 57 is constant, and will fail to the extent that this assumption may fail. Clearly, monitoring or sampling output as close in the system to the actual radiated field is desirable for maximum reliability (as is evidenced by practice in the broadcast transmission field) and the represented location of channel 65 may be regarded as symbolic of this.

The output of output sampler 53 is represented as fed via channel 63 to the second input of comparator 54. As described in more detail in the reference cited supra, the characteristic property of a differential amplifier is that it produces an output which is a function (within the operating range) determined only by the difference between the potentials applied to its two inputs. The output of comparator 54, so determined, is applied via channel 62 to the control input of controllable gain driver 55. The polarities or other significant characteristics of the potentials applied to comparator 54 are so chosen that increased output from output sampler 53 tends to cause comparator 54 to apply to controllable gain driver 55 a voltage which tends to reduce the gain of this last. Increased output from path loss computer 291, significant of greater computed path loss and of a need for greater transmitter power, tends to cause comparator 54 to cause controllable gain driver 55 to have increased gain, and thus to increase the output from antenna 34. Those skilled in the art of feedback systems will recognize this as a purely electrical closed-loop control system for causing the analogue output of the path loss computer 291 to control the level of power radiated from antenna 34.

To execute my teaching of the use of a pilot signal to measure actual path loss between the repeater and the primary transmitter, I provide a relay in accordance with the representation of FIG. 3. FIG. 3 represents all the elements represented in 22 of FIG. 1, and, in addition, a filter output and sampler 46 (represented as connected by channel 47 to antenna feed channel 21) and furnishing an output via channel 48 to standard level source 45, which feeds its output via channel 49 to relay transmitter 13. Connection of standard level source 45 to power supply 11 is represented by channel 73. It is proposed, for the embodiment here explained, that the standard level signal be in a frequency range adjacent to but distinct from the frequency range of the signals to be relayed, so that the standard level signal will suffer substantially the same attenuation and other transmission effects as the relayed signals, but will not interfere with the relayed signals. Filter and output sampler 46 is specified as containing a filter to pass the frequency band containing the standard level signal, and to attenuate the relayed signals; and it is further specified as providing an output (via channel 48) which is a measure of the radiated level of the standard level signal. Standard level source 45 is required to furnish a signal of frequency adjacent to but different from the frequencies furnished by relay receiver 12 via channel 18, and of amplitude controllable by potential applied via channel 48. This may be achieved, in accordance with well known art, by providing a piezoelectrically controlled oscillator whose output is fed through a controllable-gain buffer stage to channel 49, channel 48 being connected to apply control potential from filter and output sampler 46 to the controllable-gain buffer state.

It will be recognized that the elements numbered 46, 45 and 13 in FIG. 3 constitute a closed-loop control system which will tend to maintain constant the level of standard level signal transmitted from the repeater 50. Observations concerning the exact point of connection into the system of output sampler 53 of FIG. 2 apply equally to the exact point of connection of filter and output sampler 46.

FIG. 4 represents a primary station adapted to make use of a standard level signal transmitted from a repeater 50 to control the output power level of the primary transmitter. It may most readily be understood by comparison with FIG. 2, already explained in detail. FIG. 2 contains, inter alia, range data source 28 and path loss computer 291; FIG. 4 does not contain these latter, but contains antenna 51, primary station receiver 52, and filter-demodulator 70. Antenna 51 is represented as a separate receiving antenna, connected by channel 67 to primary station receiver 52. As here represented, primary station receiver 52 is assumed to be equipped to receive both the standard level signal and a relayed signal as well. Filter-demodulator 69 is represented as connected to the output of receiver 52 (which in the embodiment presented is an intermediate-frequency output) to separate and, as required, demodulate, the standard level signal, provided on channel 64 to comparator 54, from the desired relayed signal provided on channel 70.

FIG. 4 represents a primary transmitting system essentially similar to that represented in FIG. 2, in that its output level is determined by the potential applied to the input to comparator 54 for comparison with the potential applied by output sampler 53 via channel 63 to comparator 54. Polarity or other significant characteristics of the signals appearing on channels 63, 64, and 62 of FIG. 4 are such that the stronger the intensity of standard level signal received via antenna 51, channel 67, and primary station receiver 52, the lower the transmitted power radiated from antenna 34. This has the desired effect of producing a form of closed-loop control system between relay 50 and the primary station represented in FIG. 4, for the purpose of producing constant level of received signal at relay 50. Decreased path loss between relay 50 and the primary station causes higher locally received level of the standard level signal from relay 50; higher locally received level of that signal causes the power output of primary transmitter final 57 to be proportionately reduced, so that, after transmission over the path to relay 50, it has the desired constant value at relay 50.

One point must be observed in connection with the described dual use of primary station receiver 52: the basic function of this receiver in the execution of the purposes of my invention is to provide a measure of the attenuation of the standard level signal in its passage from the relay to the primary station. It is therefore not permissible to provide automatic gain control or any other kind of gain adjustment which would cause the relation between the field strength of the received standard level signal and the output on channel 64 to become uncertain or unpredictably variable. For this reason, also, if antennas 34 and 51 are non-isotropic, i.e., have any gain over an isotropic radiator, due allowance must be made for the difference in their gains, if any exists, and, particularly, for any variation in their relative gains if they should not both be similarly oriented with respect to the repeater. In other words, if antenna 34 has the peak of its major lobe beamed directly at the relay 50, and antenna 51 happens to be beamed with its peak slightly off relay 50, a small motion of relay 50 may move it out of the peak gain axis of antenna 34 and into the peak gain axis of antenna 51, with a vast change in the relative gains of the two antennas. This problem may, of course, readily be avoided by the use of a single antenna with a T–R isolator, as represented in FIG. 3 and well-known in the art.

It will now be perceived that the embodiment represented in FIG. 4 differs in its mode of operation from that represented in FIG. 2 in the fact that FIG. 2 represents a system in which the transmitter power output is adjusted in accordance with requirements computed from range data alone. These computed requirements may be in error because of random variations in meteorological, ionospheric, and other conditions. FIG. 4 represents a system in which the primary transmitter power output is adjusted in accordance with requirements indicated by the intensity of the standard level signal as locally received. In general, the locally received value of the standard level signal will be a fairly accurate measure of the actually existent attenuation over the communication path between the primary station and the relay. The system represented by FIG. 4 may therefore be expected to be more effective in achieving the common purpose of the embodiments of FIGS. 2 and 4.

There is, however, a practical consideration in the application of the teachings of FIG. 4 which renders the system represented by FIG. 5 worthy of consideration. As has been indicated hereinbefore, the range of variation required in primary transmitter power in order to produce constant signal level at the relay may be very great. While it is possible to produce very considerable variations in amplifier gain, this may be highly uneconomical in high-powered transmitters. To operate (for example) a 100-kilowatt transmitter output stage at a level of one kilowatt would be ridiculous. The scheme represented in FIG. 1, of switching transmitter power by discrete levels, is obviously capable of being very slightly elaborated to provide auxiliary contacts on switch 33 to cut off power input to the unused transmitter stages, or to bias them off for power economy. FIG. 5 represents some elements of FIG. 1 and some of FIG. 4 with range data source 28 feeding path loss computer, quantizer, and decoder 29 to cause it to control drive 32 in such a fashion as to make switch 33 cut in the appropriate output stage of multiple-level primary transmitter final 71 to bring the transmitter's output power into the proper power range for the known distance to the relay 50. Antenna 51, primary station receiver 52 connected thereto by channel 67, filter-demodulator 69, output sampler 53, and comparator 54 all cooperate as described in connection with FIG. 4 to adjust the drive from controllable gain driver 55 as required to produce at antenna 34 the proper power level, as determined by the locally received level of the standard level signal transmitted from relay 50. It is true that, in the system represented in FIG. 5, the gain from the output channel 61 of controllable gain driver 55 to channel 66 to antenna 34 will vary according to the particular setting of switch 33; but, since output sampler 53 is represented as having its input channel 65 tied to the antenna system beyond the output of switch 33, the closed-loop control system will automatically adjust itself to such variations in gain.

In a system in which directive antennas are employed for the primary station, range data source 28 may take the form of a tracking radar set whose servo system is employed to steer antennas 34 and 51 also; or the constant level signal may be used as a source upon which to home by automatic direction-finding equipment. In this latter case, antenna 51 may be plural or triple or quadruple, or lobe-switching, and primary station receiver 52 may be duplicated, to combine the function of receiving the standard level signal with that of direction finding. This is a clearly permissible embodiment of my invention, but subject to certain obvious limitations in that the alternate uses of the primary receiving system can never be permitted to vitiate the primary purpose of measuring the local strength of the standard level signal.

It is obvious that the possible variations in embodiments of my invention, according to the teachings of the art, are very many. For example, a highly conventional form of relay receiver 12 is one equipped with filters to separate out and demodulate separately each information signal to be relayed. If such a receiver is used, channel 18 to relay transmitter 13 must be multiple, providing a separate channel for each distinct information signal; and relay transmitter 13 must then contain carrier input equipment or some equivalent thereof to place this plurality of distinct signals in suitable separated frequency relation to one another before they are applied to modulate the relay transmitter proper. Such a design may be expected, other things being equal, to add to the weight and complexity of the relay and has therefore not been presented as a preferred embodiment, although it is apparent that some special circumstances might render it desirable or necessary. Similarly, no restriction has been placed upon the nature of the modulation of the signals to be received by the relay receiver, nor has it been required that the nature of the modulation employed in the relay transmitter be the same as that found in the signals received by the relay. It is, however, clear from the description of the functioning of my invention that the standard level signal must be transmitted by some method which renders the signal as received by primary station receiver 52 indicative of the loss suffered by the standard level signal in its passage from the relay to the primary station.

Having taught the principles of my invention and shown its use by several embodiments with explanation of the circumstances which would determine which one is to be preferred for a given application, I claim:

1. A relay communication system comprising a plurality of radiative primary stations operable to transmit information by signals on different frequencies by primary transmitting means having controllable output power level; a plurality of remote receivers of which each one is operable to receive at one time the said information transmitted by one of the said primary stations; a relay comprising a single receiver operable to receive simultaneously the signals and maintain distinct the information transmitted by each said primary station and relay transmitting means connected to the said single relay receiver to receive the said distinct information therefrom and to retransmit it as distinct information signals for reception by various receivers of the said plurality and to transmit in addition a standard level signal distinct from the other said distinct information signals; standard level signal receiving means at each said radiative primary station to receive the said standard level signal and produce an output representative of the local signal strength of the said standard level signal, transmitter power control means connected to receive the said output of said standard level signal receiving means and operatively connected to the primary transmitting means at the said radiative primary station to control the output power of the said transmitting means to be a predetermined function of the said local signal strength of the said standard level signal.

2. A radio relay system which comprises a plurality of radiative primary transmitters operable in communication channels at various distances from a relay, and a relay aforesaid comprising a relay receiver operable to receive simultaneously and maintain distinct signals from the said plurality of primary transmitters and a relay transmitter connected to the said relay receiver to receive therefrom the said received and distinct signals and to transmit them further as distinct signals and standard level signal transmitting means operable to transmit a signal of fixed amplitude; means connected to each said primary transmitter to vary the average output power of the said transmitter inversely with the locally received level of a standard level signal received from the said relay.

3. A radio transmitting apparatus comprising a radio transmitter of controllable average emitted power, radio receiving means adjacent thereto operable to receive a radio signal from a source remote from the said apparatus and to produce an output bearing a determinate relation to the local intensity of said radio signal, and power control means connected to receive the said output and responsively thereto to control the average emitted power of the said radio transmitter to be inversely proportional to the currently existing said local intensity of the said radio signal.

4. A radio transmitting apparatus comprising a radio transmitter of controllable average emitted power, radio receiving means adjacent thereto operable to receive a radio signal from a source remote from the said apparatus and to produce an output bearing a determinate relation to the local intensity of the said radio signal, power control means connected to receive the said output and responsively thereto to control the average emitted power of the said radio transmitter to be a predetermined function of the currently existing said local intensity of the said radio signal.

5. A relay communication system comprising: a plurality of radiative primary transmitters operable in different frequency channels to transmit information signals to a relay; a plurality of primary receivers of which each one is operable to receive, by relay, information signals transmitted by a selected one of said transmitters; a said relay comprising a single relay receiver for receiving simultaneously and maintaining distinct the information signals transmitted by each said primary transmitter, and relay transmitting means connected to said single relay receiver to receive the said distinct information signals therefrom and to retransmit their information distinctly for separate reception of said distinct information signals by various of said primary receivers; and means to adjust the output power of each of said primary transmitter to produce simultaneously at the said relay receiver substantially equal signal strength from each said primary transmitter in operation.

6. A relay communication system comprising: a plurality of radiative primary transmitters operable in different frequency channels to transmit information signals to a relay; a plurality of primary receivers of which each one is operable to receive, by relay, information signals transmitted by a selected one of said transmitters; a said relay comprising a single relay receiver for receiving simultaneously and maintaining distinct the information signals transmitted by each said primary transmitter, and relay transmitting means connected to said single relay receiver to receive the said distinct information signals therefrom and to retransmit their information distinctly for separate reception of said distinct information signals by various of said primary receivers; and means to adjust the output power of each said primary transmitter to produce simultaneously at the said relay receiver a predetermined signal strength from each said primary transmitter in operation.

References Cited in the file of this patent

UNITED STATES PATENTS

| | | |
|---|---|---|
| 2,292,222 | Haigis | Aug. 4, 1942 |
| 2,454,396 | Malling | Nov. 23, 1948 |
| 2,678,998 | Young | May 18, 1954 |
| 2,877,343 | Mitchell | Mar. 10, 1959 |
| 2,981,943 | Dodington | Apr. 25, 1961 |

UNITED STATES PATENT OFFICE

CERTIFICATE OF CORRECTION

Patent No. 3,151,295 September 29, 1964

Robert P. Haviland

It is hereby certified that error appears in the above numbered patent requiring correction and that the said Letters Patent should read as corrected below.

Column 9, line 60, after "in" insert -- different --; column 10, line 40, strike out "of", second occurrence.

Signed and sealed this 19th day of January 1965.

(SEAL)
Attest:

ERNEST W. SWIDER
Attesting Officer

EDWARD J. BRENNER
Commissioner of Patents